US011454062B2

(12) United States Patent
Cho et al.

(10) Patent No.: US 11,454,062 B2
(45) Date of Patent: Sep. 27, 2022

(54) BIDIRECTIONAL DOOR OPENING MODULE

(71) Applicants: Hyundai Motor Company, Seoul (KR); Kia Motors Corporation, Seoul (KR)

(72) Inventors: Ki Hyun Cho, Hwaseong-si (KR); Chung Hwa Jung, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 154 days.

(21) Appl. No.: 16/891,610

(22) Filed: Jun. 3, 2020

(65) Prior Publication Data

US 2021/0172239 A1 Jun. 10, 2021

(30) Foreign Application Priority Data

Dec. 10, 2019 (KR) ........................ 10-2019-0163265

(51) Int. Cl.

*B60J 5/02* (2006.01)
*E05F 17/00* (2006.01)
*E05F 15/616* (2015.01)

(52) U.S. Cl.

CPC ............ *E05F 17/00* (2013.01); *E05F 15/616* (2015.01); *E05F 2017/008* (2013.01);

(Continued)

(58) Field of Classification Search

CPC ......... E05F 17/00; E05F 15/616; E05F 15/53; E05F 15/611; E05F 2017/008;

(Continued)

(56) References Cited

U.S. PATENT DOCUMENTS 7,097,229 B1 * 8/2006 Chernoff .................. B60J 5/047 296/146.1
9,016,762 B2 * 4/2015 Ojima ...................... B60J 5/047 296/155

(Continued)

FOREIGN PATENT DOCUMENTS

CN 107264242 A * 10/2017
CN 208544096 U * 2/2019

(Continued)

OTHER PUBLICATIONS

English translation (machine generated) of DE-102015211065-A1 Dec. 2016.*

*Primary Examiner* — Jerry E Redman
(74) *Attorney, Agent, or Firm* — Slater Matsil, LLP

(57) ABSTRACT

A bidirectional door opening module includes a vehicle body panel located between a first door configured to be rotated to open one end of a vehicle and a second door configured to be rotated to open a remaining end of the vehicle, and a drive unit coupled to the vehicle body panel and configured to apply opening force to the first door and the second door, wherein the drive unit includes a driver configured to apply driving force so as to open the first door or the second door, rail units configured to receive the driving force of the driver and then to apply opening force to the first door or the second door, and hinge units coupled to the rail units and configured to perform rotary opening of the first door or the second door.

20 Claims, 5 Drawing Sheets

(52) U.S. Cl.
CPC ... *E05Y 2201/426* (2013.01); *E05Y 2201/636* (2013.01); *E05Y 2201/684* (2013.01); *E05Y 2201/702* (2013.01); *E05Y 2600/45* (2013.01); *E05Y 2900/531* (2013.01)

(58) Field of Classification Search
CPC ......... E05Y 2201/426; E05Y 2201/636; E05Y 2201/684; E05Y 2201/702; E05Y 2201/22; E05Y 2201/62; E05Y 2201/628; E05Y 2201/448; E05Y 2600/45; E05Y 2900/531; E05D 5/062; E05D 1/02; B60J 5/02; B60J 5/101
USPC ...... 296/146.8, 147, 107.09, 107.11, 107.16, 296/107.17
See application file for complete search history.

(56) References Cited

U.S. PATENT DOCUMENTS

| | | | | |
|---|---|---|---|---|
| 10,272,748 | B2 * | 4/2019 | Shin | E05B 83/38 |
| 2006/0197357 | A1 * | 9/2006 | Catania | B60J 5/12 296/155 |
| 2008/0104890 | A1 * | 5/2008 | Starheim | E05F 15/627 49/346 |
| 2012/0167468 | A1 * | 7/2012 | Hozumi | B60J 5/06 49/209 |
| 2014/0059925 | A1 * | 3/2014 | Marsh | E04H 1/1205 47/17 |
| 2016/0177612 | A1 * | 6/2016 | Buchheim | E05F 15/622 296/50 |
| 2016/0325712 | A1 * | 11/2016 | Goto | E05B 81/64 |
| 2016/0340938 | A1 * | 11/2016 | Chiba | B60J 5/06 |
| 2018/0251014 | A1 * | 9/2018 | Baccouche | B60J 5/0473 |
| 2018/0334321 | A1 * | 11/2018 | Strasser, Sen. | E05F 15/53 |
| 2020/0370629 | A1 * | 11/2020 | Taylor | F16C 29/008 |
| 2021/0172213 | A1 * | 6/2021 | Cho | E05B 81/20 |
| 2021/0172239 | A1 * | 6/2021 | Cho | E05F 17/00 |
| 2021/0291632 | A1 * | 9/2021 | Ding | E05F 15/40 |
| 2021/0362570 | A1 * | 11/2021 | Ledwell | B60J 5/0473 |

FOREIGN PATENT DOCUMENTS

| | | | | |
|---|---|---|---|---|
| CN | 213676921 | U * | 7/2021 | |
| DE | 102011081787 | A1 * | 2/2013 | B60J 5/0486 |
| DE | 102015211065 | A1 * | 12/2016 | B60J 5/0473 |
| KR | 101273070 | B1 | 6/2013 | |

* cited by examiner

BIDIRECTIONAL DOOR OPENING MODULE

CROSS-REFERENCE TO RELATED APPLICATIONS

This application claims priority to Korean Patent Application No. 10-2019-0163265, filed on Dec. 10, 2019, which application is hereby incorporated herein by reference.

TECHNICAL FIELD

The present disclosure relates to an opening structure for bidirectional doors.

BACKGROUND

In general, a door having a swinging structure which is rotated to be opened in an outward direction is mounted as a vehicle door. This door having the swinging structure, after a driver or a passenger unlocks the door through a handle installed on the door when the driver or the passenger gets into or out of the vehicle, allows the driver or the passenger to rotate the door in an outward direction so as to form a space between the door and a vehicle body and then to get into or out of the vehicle through the space.

Further, a door having a sliding structure which is slid in forward and backward directions to be opened and closed is applied to a vehicle, such as a van or a concept car.

The above door having the sliding structure, after a driver or a passenger unlocks the door through a handle installed on the door when the driver or the passenger gets into or out of the vehicle, allows the driver or the passenger to slide the door in the forward and backward directions so as to form a space in the side surface of a vehicle body and then to get into or out of the vehicle through the space.

Recently, together with development of autonomous vehicles, standards for drivers' seats for driving vehicles have been relaxed, and various methods for getting into and out of vehicles have been researched.

Therefore, doors which are bidirectionally opened about a roof of a vehicle so that a driver or a passenger may easily access the interior of the vehicle is required, and thus, an opening structure for two doors facing each other are required.

Further, in case of a vehicle including a two door opening structure, problems with convenience in maintenance of a drive unit and safety upon vehicle overturn are caused.

Korean Patent Application No. 10-2011-0097657 discloses subject matter related to the subject matter disclosed herein.

SUMMARY

Embodiments of the present invention can be used to solve problems associated with the prior art, for example, by providing a bidirectional door opening module which may provide a drive unit detachably attached to a vehicle.

The present disclosure relates to an opening structure for bidirectional doors. Particular embodiments relate to a bidirectional door opening module which is configured to simultaneously or selectively open a first door and a second door, locking of which is released through a drive unit detachably attached to a vehicle body panel in a vehicle provided with the first door and the second door which are located at front and rear portions of the vehicle and are rotated to be opened in the height direction of the vehicle.

Another embodiment of the present invention provides a bidirectional door opening module which may provide rigidity to a vehicle body panel even when a vehicle overturns.

In one aspect, embodiments of the present invention provide a bidirectional door opening module including a vehicle body panel located between a first door configured to be rotated to open one end of a vehicle and a second door configured to be rotated to open a remaining end of the vehicle, and a drive unit coupled to the vehicle body panel and configured to apply opening force to the first door and the second door, wherein the drive unit includes a driver configured to apply driving force so as to open the first door or the second door, rail units configured to receive the driving force of the driver and then to apply opening force to the first door or the second door, and hinge units coupled to the rail units and configured to perform rotary opening of the first door or the second door.

In an embodiment, the driver may further include a spindle unit including bidirectional spindles, and gas lift units configured to provide tension in a direction of applying driving force of the spindle unit.

In another embodiment, the rail units may be coupled to the spindle unit, and both ends of the rail units may be coupled to the hinge units.

In still another embodiment, the gas lift units may include ball sockets configured to be coupled to ball joints of the rail units.

In yet another embodiment, the drive unit may further include a fixing member configured to mount the drive unit on the vehicle body panel.

In still yet another embodiment, the bidirectional door opening module may further include guide units configured to guide movement of the rail units in a direction of applying the driving force.

In a further embodiment, the bidirectional door opening module may further include at least one ball bearing located at upper and lower ends of the rail units, and hinge push units located at both ends of the rail units and configured to transmit the driving force to the hinge units.

In another further embodiment, each of the hinge units may include a hinge base coupled to each of the hinge push units, and a hinge arm provided with one end coupled to the hinge base and a remaining end coupled to an inside of each of the first door and the second door.

In still another further embodiment, the hinge base may be configured such that a hinge connection unit coupled to the rail unit moves along a slot located in the hinge base and the hinge push unit rotates the hinge arm to open the hinge arm.

In yet another further embodiment, one end of the hinge unit may be coupled to the rail unit, and when the opening force is applied to the rail unit, the hinge unit may be rotated to be opened about the one end of the hinge unit.

Other aspects and embodiments of the invention are discussed herein.

The above and other features of the invention are discussed herein.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
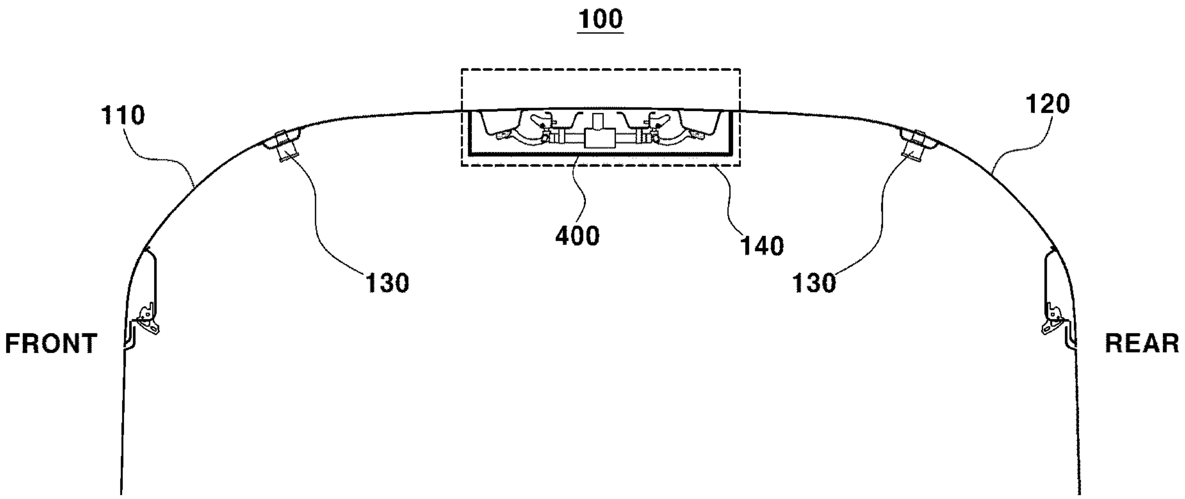
FIG. 1 is a longitudinal-sectional view of a vehicle including a bidirectional door opening module according to one embodiment of the present invention.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments within the spirit and scope of the invention as defined by the appended claims.

In the following description of the embodiments, terms, such as "... part", "... unit", "... member", etc., mean units for processing at least one function or operation, and they may be implemented by hardware or a combination of hardware.

Also, in the following description of the embodiments, terms, such as "first", "second", etc., are used only to distinguish one element from other elements, and do not limit the sequence of the elements.

In addition, in the following description of the embodiments, elements relating to connection between a first door and a second door having the same operating relations and a drive unit may be described while omitting the terms "first" and "second".

Further, in the following description of the embodiments, doors conceptually include a first door and a second door.

Embodiments of the present invention relate to a vehicle including two doors 110 and 120, and more particularly, to a bidirectional door opening module 100. In embodiments of the present invention, a first door 100 is configured such that one end of the first door 110 is rotated to be opened upwards in the height direction about the other end of the first door 110 adjacent to a vehicle body panel 400.

A second door 120 is configured such that one end of the second door 120 is rotated to be opened upwards in the height direction about the other end of the second door 120 adjacent to the vehicle body panel 400.

Each of the first door 110 and the second door 120 may include a locking unit 130. Further, locking of the first door 110 and the second door 120 through the corresponding locking units 130 is released according to a user request, and opening force of a drive unit 140 is applied to the first door 110 or the second door 120 in which the locking unit 130 is unlocked or is simultaneously applied to the first door 100 and the second door 120 in which the locking units 130 are unlocked so as to open the doors 100 and 120.

More particularly, the drive unit 140 applies opening force so as to open the first door 110 and the second door 120, and thus, tension from the drive unit 140 is applied to the first door 110 or the second door 120 in which the locking unit 130 is unlocked.

FIG. 1 is a longitudinal-sectional view of a vehicle in which a bidirectional door opening module 100 for vehicle doors, which are bidirectionally opened, according to one embodiment of the present invention is mounted.

As shown in this figure, the bidirectional door opening module 100 includes the drive unit 140 located on an upper end vehicle body panel 400 of the vehicle, and one end of the first door 110 is rotated to be opened about the other end of the first door 110 adjacent to the front end of the drive unit 140. Further, one end, i.e., the rear end, of the second door 120 is rotated to be opened about the other end of the second door 120 adjacent to the rear end of the drive unit 140.

The drive unit 140 is located on the vehicle body panel 400 between the first door 110 and the second door 120.

The drive unit 140 may include a differential gear configured to apply driving force from a motor to the first door 110 and the second door 120. The differential gear is configured to apply driving force from the motor to a spindle unit 151 or gas lift units 152 (see, e.g., FIG. 3).

Therefore, the differential gear of the drive unit 140 applies opening force to at least one of the first door 110 or the second door 120, which is unlocked, and thus, the at least one of the first door 110 or the second door 120, which is unlocked, is opened.

More particularly, if user unlocking input is applied to the locking units 130 located on the first door 110 and the second door 120, the drive unit 140 corresponding the at least one of the first door 110 or the second door 120, which is unlocked, is driven, and thus, the at least one of the first door 110 or the second door 120, which is unlocked, is opened.

In addition, the gas lift units 152 of the drive unit 140 may be configured to perform a function of damping the doors 100 and 120 which are rotated downwards, when the opened doors 110 and 120 are closed, thereby providing driving force for opening the doors 110 and 120 and preventing the doors 110 and 120 from rapidly falling while being closed.

The locking units 130 may include a first locking unit 130 configured to unlock the first door 110 and a second locking unit 130 configured to unlock the second door 120, a first spindle is driven in response to unlocking input of the first locking unit 130, and a second spindle is driven in response to unlocking input of the second locking unit 130.

Unlocking input signals of the locking units 130 and driving instructions of a driver 150 may be controlled by a controller (not shown).

Figure 2:
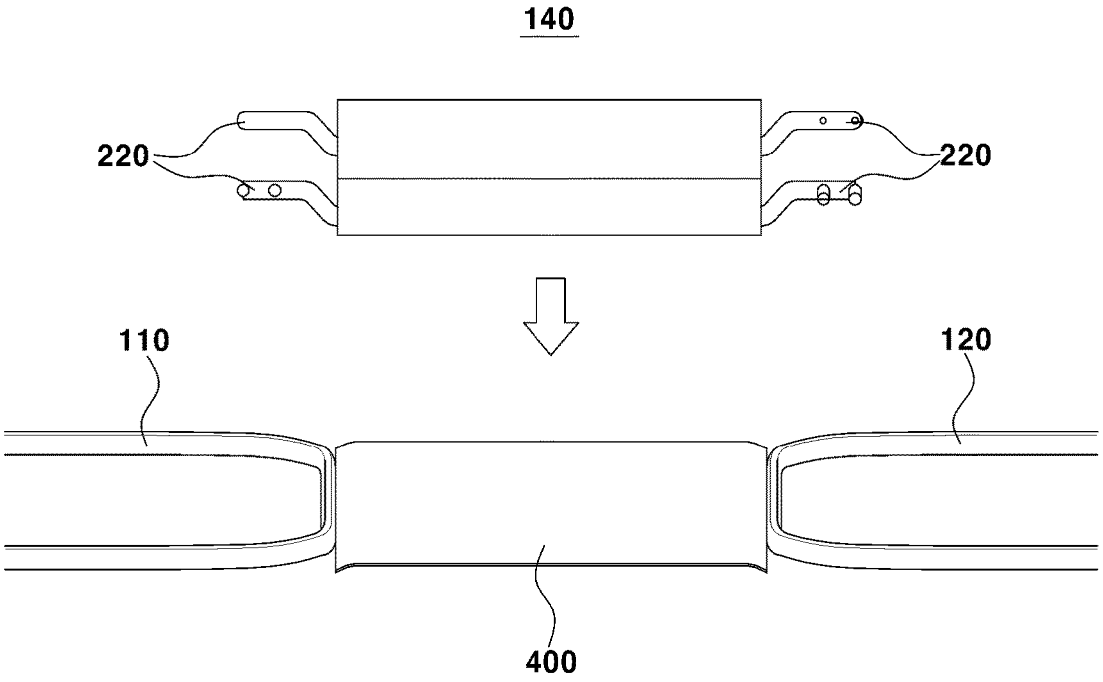
FIG. 2 is a schematic view illustrating mounting of the bidirectional door opening module according to one embodiment of the present invention on the vehicle.

FIG. 2 is a schematic view illustrating coupling of the bidirectional door opening module 100 to the vehicle body panel 400 of the vehicle, according to one embodiment of the present invention.

Figure 7:
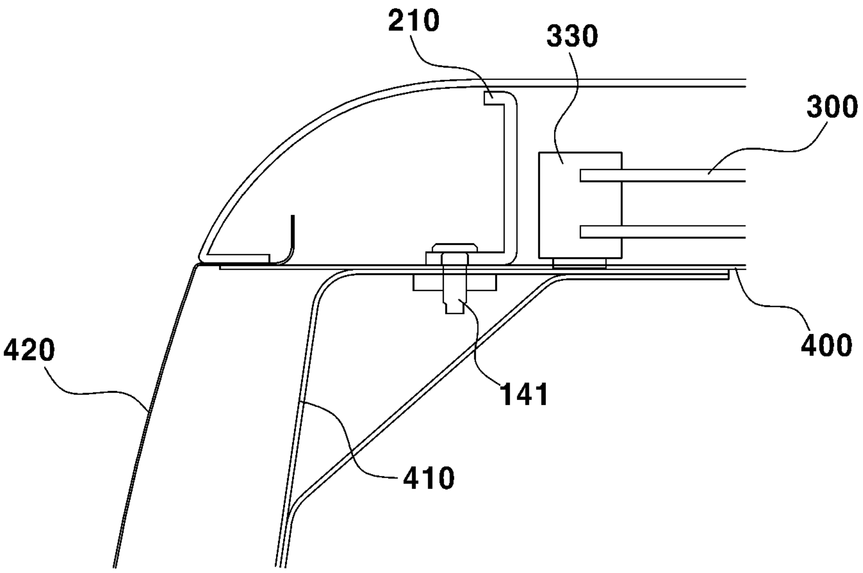
FIG. 7 is a longitudinal-sectional view of an assembled state of the bidirectional door opening module according to one embodiment of the present invention.

As shown in this figure, the bidirectional door opening module 100 is configured to be coupled to the vehicle body panel 400 such that the bidirectional door opening module 100 is fixed to the vehicle body panel 400 using fixing members 141 (see, e.g., FIG. 7). More particularly, hinge bases 210 may be coupled to the vehicle body panel 400 by the fixing members 141.

The vehicle body panel 400 may mean a side inner panel 410, or include a side outer panel 420 or a roof panel 400. In embodiments of the present invention, the vehicle body panel 400 may be interpreted to conceptually include all panels forming the vehicle body.

The vehicle body panel 400 may be located between the first door 110 and the second door 120 so as to be indented to a depth corresponding to the height of the bidirectional door opening module 100, and thus, a roof of the vehicle may be configured such that no gap is formed along the first door 110 and the second door 120 in the state in which the bidirectional door opening module 100 is mounted on the vehicle.

The bidirectional door opening module 100 includes a hinge unit 200 provided at the front end thereof so as to be coupled to the first door 110, and a hinge unit 200 provided at the rear end thereof so as to be coupled to the second door 120. The hinge units 200 are fixedly coupled to the inner surfaces of the first door 110 and the second door 120, and the hinge units 200 are rotated to be opened by driving force applied from the bidirectional door opening module 100 and thus open the first door 110 and the second door 120.

The controller receives an unlocking signal of the locking unit 130 located inside the first door 110 or the second door 120, and converts driving force of the driver 150 of the bidirectional door opening module 100 into opening force so as to open the first door 110 or the second door 120, which is unlocked.

More particularly, the driver 150 may include the spindle unit 151 and the gas lift units 152, and may be configured to open at least one of the doors 110 or 120, which is unlocked.

At least one hinge unit 200 is located at each of the front and rear ends of the bidirectional door opening module 100 so as to transmit opening force to the respective doors 110 and 120 through the driver 150 of the drive unit 140. More particularly, two hinge units 200 are provided at each of the front and rear ends of the bidirectional door opening module 100, and are coupled to the corresponding doors 110 and 120 by bolts.

Figure 3:
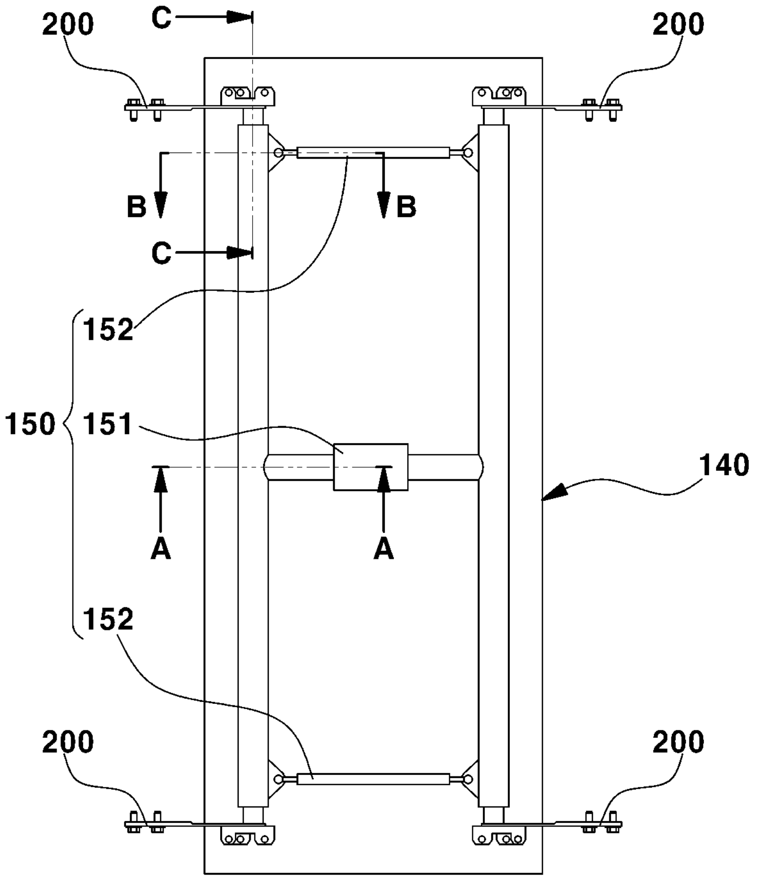
FIG. 3 is a rear view of the bidirectional door opening module according to one embodiment of the present invention.

FIG. 3 illustrates coupling relations between the elements of the bidirectional door opening module according to one embodiment of the present invention.

As shown in this figure, coupling relations of the drive unit 140 of the bidirectional door opening module 100 are illustrated in the state in which a rear housing of the bidirectional door opening module 100 is removed.

The bidirectional door opening module 100 includes the driver 150 including the bidirectional spindle unit 151 and the gas lift units 152, rail units 300 located at front and rear portions of the vehicle such that driving force of the driver 150 is applied thereto, and the hinge units 200 located at both side surfaces of the rail units 300 so as to be coupled to the first door 110 and the second door 120.

The drive unit 140 may be configured to be mounted on the vehicle body panel 400, and to be coupled to the first door 110 and the second door 120 by the hinge units 200, and in this case, the drive unit 140 may be fixedly coupled to the hinge units 200 inside panel units forming the first door 110 and the second door 120.

More particularly, the first hinge units 200 located inside the first door 110 and the second hinge units 200 located inside the second door 120 are fixedly connected to the rail units 300 coupled to the driver iso.

Figure 8:
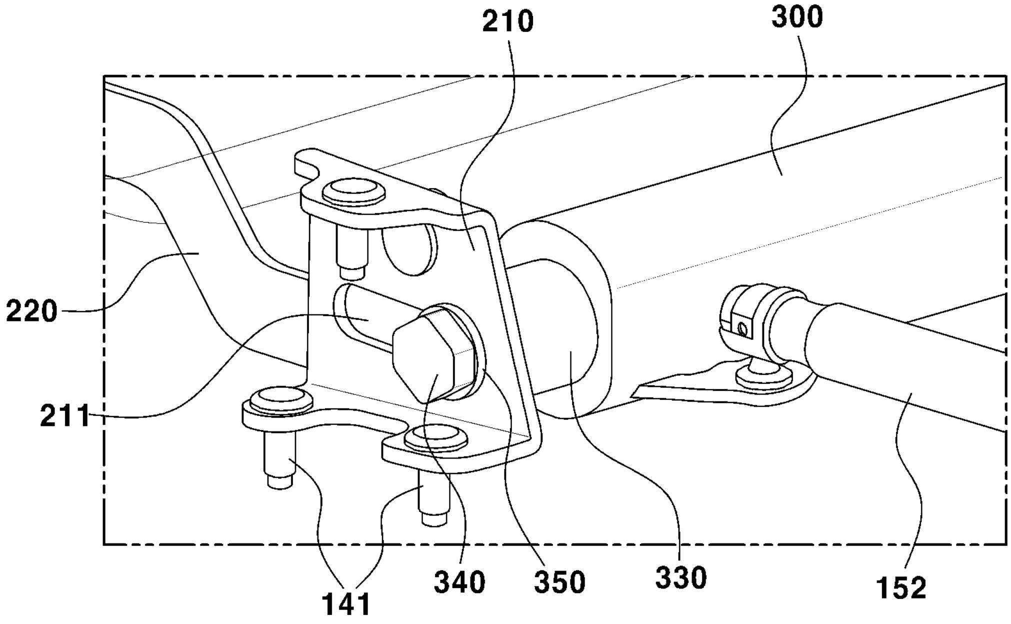
FIG. 8 is an enlarged view of a hinge unit of the bidirectional door opening module according to one embodiment of the present invention.

The first hinge units 200 and the second hinge units 200 are coupled to both ends of the rail units 300, more particularly, the hinge bases 210 are coupled to both ends of the rail units 300, and a hinge arm 220 is rotated about the hinge base 210 as a hinge push unit 330 provided on the rail unit 300 moves along the inside of a slot 211 formed in the hinge base 210 (see, e.g., FIG. 8).

More particularly, if the spindle unit 151 extends in the longitudinal direction by the controller, the rail units 300 move towards the outside of the drive unit 140, and the hinge push units 330 provided at the rail units 300 apply rotary opening force to the hinge units 200 so as to rotate the first door 110 and the second door 120 about the hinge bases 210.

According to one embodiment of the present invention, when unlocking input of the locking unit 130 of the first door 110 or the second door 120 is applied to the controller, the controller extends the spindle in a direction toward the door 110 or 120, which is unlocked, through the spindle unit 151 to which driving force is applied, and the rail unit 300 is moved in a direction toward the door 110 or 120 to be opened due to extension of the spindle. More particularly, the controller controls the rotating speed of a motor for driving the spindle unit 151, thus applying driving force to the spindle unit 151.

When the rail unit 300 is moved, the rotary opening force is applied to the hinge units 200 located at both side surfaces of the rail unit 300, and one end of the unlocked door 110 or 120, which is farthest away from the bidirectional door opening module 100, is rotated in the height direction of the vehicle. More particularly, the door 110 or 120 to be opened may be rotated to be opened about the hinge bases 210 at which the hinge units 200 and the rail unit 300 are coupled.

When driving force due to the spindle unit 151 is applied to the rail unit 300, the gas lift units 152, the length of which may extend in the same direction as the spindle unit 151, are operated so as to add opening force of the door 110 or 120 through the hinge units 200. Since a great load may be applied to the doors 110 and 120 due to the structure thereof, this configuration serves to apply driving force from multiple positions so as to apply sufficient opening force to the door 110 or 120, which is unlocked.

Further, the spindle unit 151 and the gas lift units 152 may reduce a high falling speed of the door 110 or 120 due to the load thereof when the door 110 or 120 is moved from the opened state to the closed state, and the positions and numbers of spindle units 151 and the gas lift units 152 may be varied.

Hereinafter, coupling relations between the elements of the bidirectional door opening module 100 in which the spindle unit 151 and the gas lift units 152 forming the driver 150 are located will be described.

Figure 4:
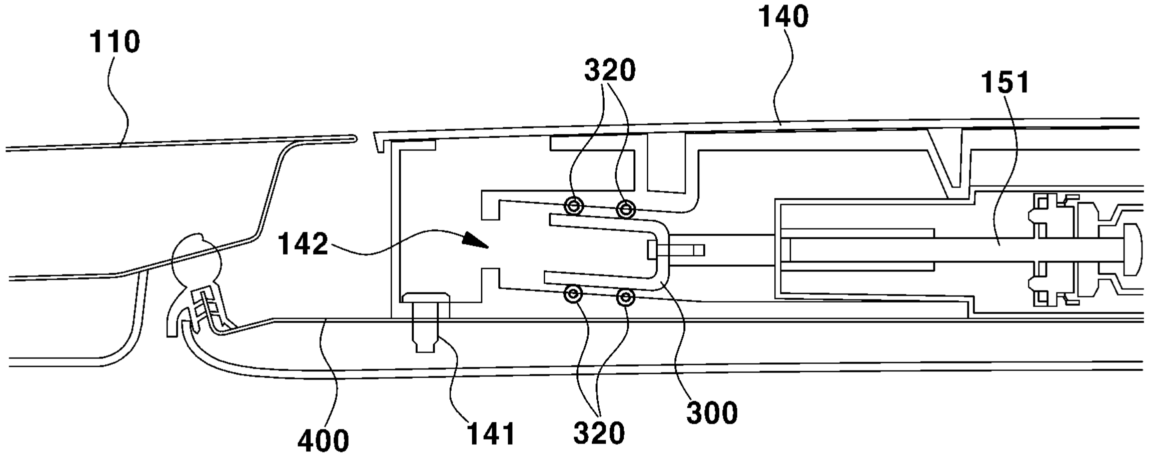
FIG. 4 is a longitudinal-sectional view of a spindle unit of the bidirectional door opening module according to one embodiment of the present invention.

FIG. 4 is a longitudinal-sectional view taken along line A-A of FIG. 3, illustrating coupling relations between the spindle unit 151 and the rail unit 300 according to one embodiment of the present invention.

The bidirectional door opening module 100 is configured to be located at the upper end of the vehicle body frame 400, and a head lining is located inside the vehicle body frame 400.

At least one spindle unit 151 is located inside a housing of the bidirectional door opening module 100, and is configured to selectively apply opening force to the first door 110 and the second door 120.

As described above, the spindle unit 151 may include the bidirectional spindles, the motor configured to apply driving force to the bidirectional spindles, and the differential gear configured to apply the driving force of the motor to the bidirectional spindles.

The spindle unit 151 including the differential gear is configured to apply rotating force generated by the motor to the bidirectional spindles so as to apply tension to the respective spindles, and the spindles extend in a direction toward the door 110 or 120, which is unlocked, so as to rotate and open the door 110 or 120 through the hinge units 200. Here, the differential gear is configured such that, among the bidirectional spindles, the spindle facing the door 110 or 120, locking of which is maintained, does not extend in the length direction.

Both ends of the spindle unit 151 are coupled to the rail units 300, and in one embodiment of the present invention, the rail units 300 and the ends of the spindle unit 151 are bolted to each other.

The rail units 300 located inside the housing of the bidirectional door opening module 100 receive tension in the length direction from the spindle unit 151 and are moved in a direction toward the door 110 or 120, which is unlocked, and the bidirectional door opening module 100 includes guide units 142 configured to guide the rail units 300 to moving paths inside the housing.

Further, the bidirectional door opening module 100 includes at least one ball bearing 320 located at a vertical end, i.e., the upper end or the lower end, of the rail unit 300 at a position where the rail unit 300 and the guide unit 142 face each other, and the ball bearings 320 may prevent force dispersion caused by frictional force in response to extension of the rail unit 300 in the length direction of the guide unit 142.

As such, the rail units 300 are configured such that tension in the length direction from the spindle unit 151 is applied to the rail units 300, the hinge arms 220 are rotated by the hinge push parts 330 located at both ends of the rail units 300, and thus, opening force caused by tension of the spindle unit 151 is applied to the door 110 or 120.

Further, if tension from the spindle unit 151 is applied, the gas lift units 152 extend in the length direction of the vehicle in the state of being interlocked with the spindle unit 151, and this operation will be described below.

Figure 5:
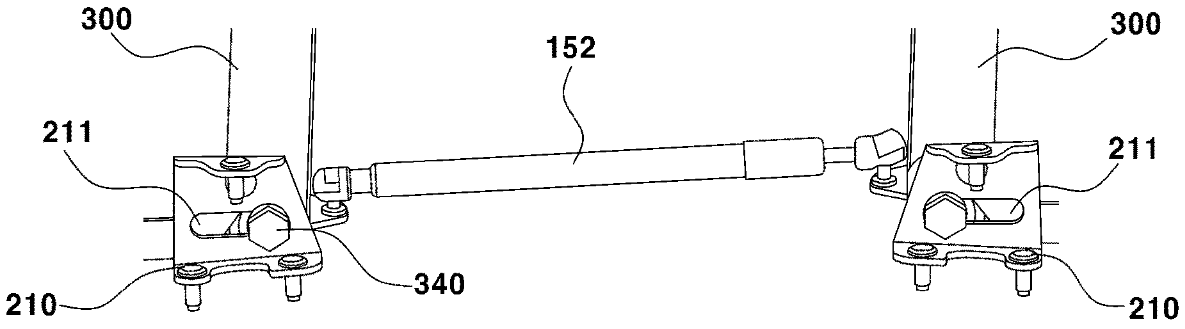
FIG. 5 is a view illustrating an assembled state of a gas lift unit of the bidirectional door opening module according to one embodiment of the present invention.
Figure 6:
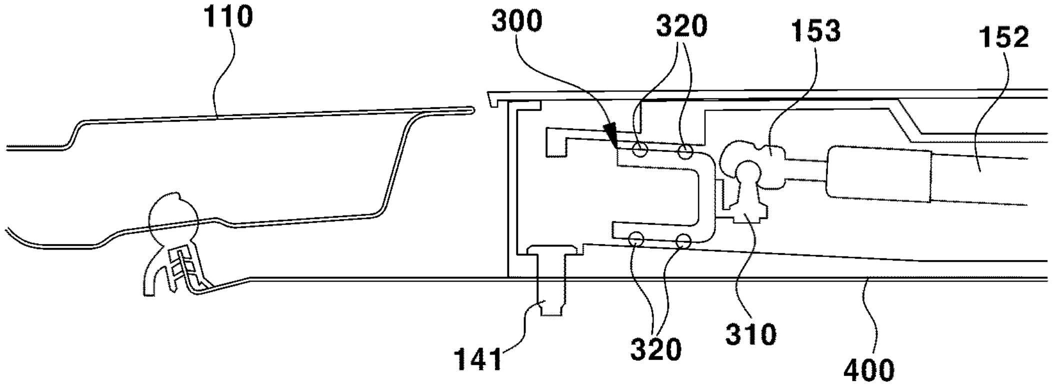
FIG. 6 is a longitudinal-sectional view of the gas lift unit of the bidirectional door opening module according to one embodiment of the present invention.

FIG. 5 is a view illustrating a state in which the gas lift unit 152 is coupled to the rail units 300 according to one embodiment of the present invention, and FIG. 6 is a longitudinal-sectional view of the bidirectional door opening module 100 including the gas lift units 152 according to one embodiment of the present invention.

As shown in these figures, one or more gas lift units 152 are provided in the length direction of the bidirectional door opening module 100, and when driving force is applied to the spindle unit 151 by the controller, the one or more gas lift units 152 simultaneously extend so as to apply tension to the rail units 300.

More particularly, the gas lift units 152 are configured to be coupled to the rail units 300 located at both ends of the gas lift units 152 and to be selectively coupled to the inside of the housing of the bidirectional door opening module 100.

The controller applies driving force to the motor of the spindle unit 151 and simultaneously the gas lift units 152 extend, and thereby, driving force of the spindle unit 151 and tension of the gas lift units 152 are applied to the rail unit 300 so as to apply opening force to the hinge units 200.

More particularly, both ends of the rail unit 300 moved in the length direction move along the slots 211 located inside the hinge bases 210, and the hinge push units 330 inside the hinge bases 210 rotate the hinge arms 220, thereby applying opening force to open the door 110 or 120.

FIG. 6 is a longitudinal-sectional view illustrating coupling relations between the rail unit 300 and the gas lift unit 152, and a ball joint 310 is located at the end of the rail unit 300. Further, the gas lift unit 152 is coupled to the ball joint 310 located at the end of the rail unit 300 through a ball socket 153 located at the end of the gas lift unit 152.

In one embodiment of the present invention, the gas lift units 152 may be coupled to both ends of the rail units 300, without a separate fixing structure inside the housing, and thus, if the gas lift units 152 extend in the length direction, the gas lift units 152 coupled to the ball joints 310 may have a designated degree of freedom.

As such, if the controller receives unlocking input for the door 110 or 120, the spindle unit 151 extends in a direction toward the door 110 or 120, which is unlocked, and simultaneously, the gas lift units 152 also extend, thereby being capable of applying opening force so as to rotate and open the door 110 or 120 through the hinge units 200.

Of course, opening force may be set so that the door 110 or 120 is rotated to be opened using the spindle unit 151 alone.

FIG. 7 is a longitudinal-sectional view of the bidirectional door opening module according to one embodiment of the present invention, taken along line C-C of FIG. 3.

As shown in this figure, the bidirectional door opening module 100 is located at the upper end of the vehicle body panel 400 including the side inner panel 410. The outer surface of the outer panel 420 and the outer surface of the bidirectional door opening module 100 form the same plane.

The bidirectional door opening module 100 is fixed to the side inner panel 410 through the fixing members 141, and more particularly, the lower ends of the hinge bases 210 are fixed to the side inner panel 410 forming the vehicle body panel 400.

The side inner panel 410 includes a rigidity reinforcement member provided therein so as to support the bidirectional door opening module 100, and coupling structures between the hinge bases 210 and the vehicle body panel 400 are located so as not to be exposed to the interior of the vehicle.

The rail unit 300 including the hinge push units 330 is located inside the hinge bases 210, and more particularly, the rail unit 300 including the hinge push units 330 is moved along the slots 211 located in the hinge bases 210.

The bidirectional door opening module 100 is located so as to be coupled to the upper portion of the side inner panel 410, and the rail units 300 of the bidirectional door opening module 100 are formed in the width direction of the side inner panel 410 and may thus increase roof supporting rigidity of the vehicle.

The hinge push units 330 are located at both ends of the rail units 300, and thus the hinge push units 330 integrally with the rail units 300 are moved in the length direction of the vehicle to apply rotating force to the hinge arms 220 contacting the hinge push units 330.

More particularly, the hinge push unit 330 is located adjacent to the lower end of a rotation axis of the hinge arm 220 located on the hinge base 210, and the hinge arm 220 is configured such that the other end of the hinge arm 220 is raised in the height direction of the vehicle about the rotation axis in response to movement of the hinge push unit 330 in the length direction.

FIG. 8 is an enlarged view illustrating coupling relations between the hinge unit 200 and the rail unit 300 according to one embodiment of the present invention.

As shown in this figure, the bidirectional door opening module 100 includes the hinge bases 210 located at both ends of the rail unit 300, and hinge connection units 340 configured to pass through the hinge bases 210 and then to be coupled to the rail unit 300.

The hinge connection unit 340 passes through the slot 211 located in the hinge base 210 and is coupled to the end of the rail unit 300, and more particularly, the hinge connection unit 340 is coupled to the hinge push unit 330.

The slot 211 located in the hinge base 210 is formed in the length direction of the vehicle, and when the rail unit 300 extends in the length direction through the driver 150, the rail unit 300 is moved along the hinge base 210 by the hinge connection unit 340.

The rotation axis of the hinge arm 220 is located at the upper end of the hinge base 210 in which the slot 211 is located, and the hinge arm 220 is rotated upwards and downwards about the rotation axis. More particularly, the hinge arm 220 is located so as to interfere with the hinge push unit 330 located at the of the rail unit 300 in the width direction of the vehicle, and thus when the hinge push unit 330 integrally with the rail unit 300 is moved along the slot 211 in the length direction, the hinge arm 220 located in the moving direction of the hinge push unit 330 is rotated in the state of being interlocked with movement of the hinge push unit 330.

The hinge connection unit 340 may include a bolt, a bush 350 may be provided at a position where the slot 211 and a head part of the bolt face each other. The bolt may be coupled to the rail unit 300 along a screw thread located inside the rail unit 300.

Figure 9:
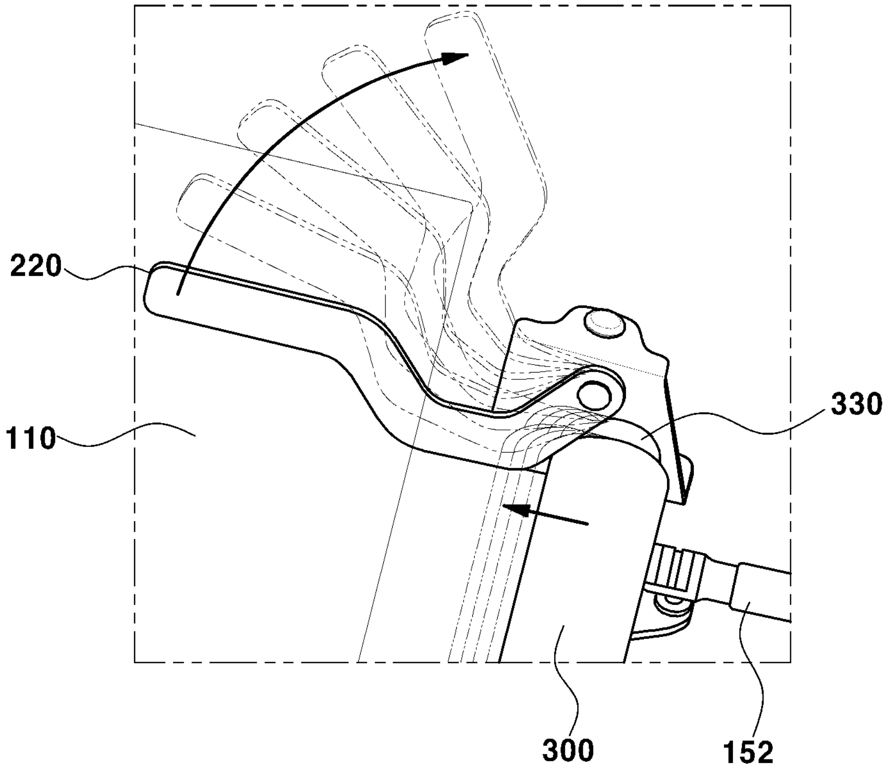
FIG. 9 is a view illustrating an operating state of the hinge unit of the bidirectional door opening module according to one embodiment of the present invention.

FIG. 9 is a view illustrating rotation of the hinge arm 220 in response to movement of the hinge push unit 330 according to one embodiment of the present invention.

The rail units 300 located at both sides of the bidirectional door opening module 100 are configured to extend towards the door 110 or 120, which is unlocked, according to driving of the driver 150 of the drive unit 140, and the rail units 300 are moved in the length direction by tension of the driver iso.

More particularly, the spindle unit 151 extends to the door 110 or 120, which is unlocked, in the length direction, and when additional tension is applied by the gas lift units 152, the corresponding rail unit 300 is moved in the length direction along the slots 211 located in the hinge bases 210.

The rail unit 300 and the hinge push units 330 are fixed to the hinge bases 210 by the hinge connection units 340 located to pass through the slots 211 located in the hinge bases 210 and are moved along the slots 211, and the hinge arms 220 located on the moving paths of the hinge push units 330 are rotated by rectilinear movement of the hinge push units 330.

One end of the hinge arm 220 is located inside the door 110 or 120 of the vehicle, and the other end of the hinge arm 220 is configured to form the rotation axis at the upper end of the slot 211 of the hinge base 210. Therefore, the hinge push unit 330 contacts the hinge arm 220, and thus, when the hinge push unit 330 is rectilinearly moved, one end of the hinge arm 220 is raised under the condition that the other end of the hinge arm 220 is fixed.

As such, embodiments of the present invention provide the bidirectional door opening module 100 which may be coupled to the vehicle body panel 400 of the vehicle, and when unlocking input of the vehicle is applied through the controller, the spindle unit 151 and the gas lift units 152 of the driver 150 extend the rail units 300.

Further, the hinge push units 330 located at both ends of the rail unit 300 apply rotary opening force to the hinge arms 220 located on one surface of each of the hinge bases 210 so as to contact the hinge push units 330.

That is, embodiments of the present invention provide the bidirectional door opening module 100 in which the driver 150 configured to provide lengthwise moving force of the rail units 300 applies rotary opening force to the hinge units 200, and the first door 110 or the second door 120 is rotated to be opened in the height direction of the vehicle through the hinge units 200, to which rotary opening force is applied.

As is apparent from the above description, embodiments of the present invention may provide the following effects through the above-described configuration and connection and usage relations.

A bidirectional door opening module according to embodiments of the present invention may be selectively attached to a vehicle body panel, thereby being capable of providing convenience in maintenance and replacement.

In addition, the bidirectional door opening module according to embodiments of the present invention includes at least one rail unit located in the width direction of a vehicle, thereby being capable of increasing vehicle body stability against vehicle overturn.

Further, the bidirectional door opening module according to embodiments of the present invention includes a detachable drive unit, thereby being capable of improving productivity.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. That is, while the invention has been explained in relation to the embodiments thereof, it is to be understood that various modifications thereof will become apparent to those skilled in the art upon reading the specification. These embodiments have been described to explain the best mode to implement the technical scope of the invention, and various modifications required for the specific application and purpose of the present invention are possible. Although, in the above description, a first door which may be located at a front region and a second door which may be located at a rear region have been described as bidirectional doors, the first door and the second door may include all doors which are located at symmetrical positions, i.e., one door located on the side surface of a vehicle and another door located on the side surface of the vehicle at a position which is opposite the first door, and the positions of the first door and the second door are not limited. Therefore, the above detailed description of embodiments of the present invention is not intended to limit the invention. Further, it must be interpreted that the accompanying claims include other modes.

What is claimed is:

1. A bidirectional door opening module comprising:

a vehicle body panel located between a first door configured to be rotated to open a first end of a vehicle and a second door configured to be rotated to open a second end of the vehicle, the second end different than the first end; and a drive unit coupled to the vehicle body panel and configured to apply an opening force to the first door and the second door, wherein the drive unit comprises:

a driver configured to apply the driving force so as to open the first door or the second door;

rail units configured to receive the driving force of the driver and then to apply the opening force to the first door or the second door;

hinge units coupled to the rail units and configured to perform rotary opening of the first door or the second door; and hinge push units located at both ends of the rail units and configured to transmit the driving force to the hinge units.

2. The bidirectional door opening module of claim 1, wherein the driver comprises a spindle unit comprising bidirectional spindles.

3. The bidirectional door opening module of claim 2, wherein the rail units are coupled to the spindle unit, and both ends of the rail units are coupled to the hinge units.

4. The bidirectional door opening module of claim 2, wherein the driver further comprises gas lift units configured to provide tension in a direction of applying driving force of the spindle unit.

5. The bidirectional door opening module of claim 1, wherein the drive unit further comprises a fixing member configured to mount the drive unit on the vehicle body panel.

6. The bidirectional door opening module of claim 1, further comprising guide units configured to guide movement of the rail units in a direction of applying the driving force.

7. The bidirectional door opening module of claim 1, further comprising at least one ball bearing located at upper and lower ends of the rail units.

8. The bidirectional door opening module of claim 7, wherein each of the hinge units comprises:

a hinge base coupled to each of the hinge push units; and a hinge arm provided with one end coupled to the hinge base and a remaining end coupled to an inside of one of the first door or the second door.

9. The bidirectional door opening module of claim 8, wherein the hinge base is configured such that a hinge connection unit coupled to a respective one of the rail units is configured to move along a slot located in the hinge base and the hinge push unit is configured to rotate the hinge arm to open the first door or the second door.

10. The bidirectional door opening module of claim 8, wherein the hinge push unit is located adjacent to a lower end of a rotation axis of the hinge arm located on the hinge base, and a remaining end of the hinge arm is raised in a height direction of the vehicle about the rotation axis in response to lengthwise movement of the hinge push unit.

11. The bidirectional door opening module of claim 1, further comprising a rail, wherein one end of the rail is coupled to one of the rail units, and when the opening force is applied to the one of the rail units, a respective hinge unit is configured to be rotated to be opened about the one end of the respective hinge unit.

12. A bidirectional door opening module comprising:

a vehicle body panel located between a first door configured to be rotated to open a first end of a vehicle and a second door configured to be rotated to open a second end of the vehicle, the second end different than the first end; and a drive unit coupled to the vehicle body panel and configured to apply an opening force to the first door and the second door, wherein the drive unit comprises:

a driver configured to apply a driving force so as to open the first door or the second door, wherein the driver comprises a spindle unit comprising bidirectional spindles and gas lift units configured to provide tension in a direction of applying the driving force of the spindle unit;

rail units configured to receive the driving force of the driver and then to apply the opening force to the first door or the second door, wherein the gas lift units comprise ball sockets configured to be coupled to ball joints of the rail units; and hinge units coupled to the rail units and configured to perform rotary opening of the first door or the second door.

13. A vehicle comprising:

a first door configured to be rotated to open a first end of the vehicle;

a second door configured to be rotated to open a second end of the vehicle, the second end different than the first end;

a vehicle body panel located between the first door and the second door; and a drive unit coupled to the vehicle body panel, the drive unit comprising:

a driver configured to apply a driving force so as to open the first door or the second door;

a rail unit configured to receive the driving force of the driver and then to apply an opening force to the first door or the second door;

hinge units coupled to both ends of the rail unit and configured to perform rotary opening of the first door or the second door; and hinge push units located at both ends of the rail unit and configured to transmit the driving force to the hinge units.

14. The vehicle of claim 13, wherein:

the driver comprises a spindle unit comprising bidirectional spindles;

the rail unit is coupled to the spindle unit; and both ends of the rail unit are coupled to the hinge units.

15. The vehicle of claim 14, wherein:

the driver further comprises gas lift units configured to provide tension in a direction of applying driving force of the spindle unit; and the gas lift units comprise ball sockets configured to be coupled to ball joints of the rail unit.

16. The vehicle of claim 13, wherein the drive unit further comprises a fixing member configured to mount the drive unit on the vehicle body panel.

17. The vehicle of claim 13, further comprising:

a guide unit configured to guide movement of the rail unit in a direction of applying the driving force; and at least one ball bearing located at each of upper and lower ends of the rail unit.

18. The vehicle of claim 17, wherein each of the hinge units comprises:

a hinge base coupled to each of the hinge push units; and a hinge arm provided with one end coupled to the hinge base and a remaining end coupled to an inside of one of the first door or the second door.

19. The vehicle of claim 18, wherein:

the hinge base is configured such that a hinge connection unit coupled to the rail unit is configured to move along a slot located in the hinge base and the hinge push unit is configured to rotate the hinge arm to open the first door or the second door; and the hinge push unit is located adjacent to a lower end of a rotation axis of the hinge arm located on the hinge base, and a remaining end of the hinge arm is raised in a height direction of the vehicle about the rotation axis in response to lengthwise movement of the hinge push unit.

20. The vehicle of claim 13, wherein one end of one of the hinge units is coupled to the rail unit, and when the opening force is applied to the rail unit, the one of the hinge units is configured to be rotated to be opened about the one end of the hinge unit.

* * * * *